United States Patent Office 3,069,864
Patented Dec. 25, 1962

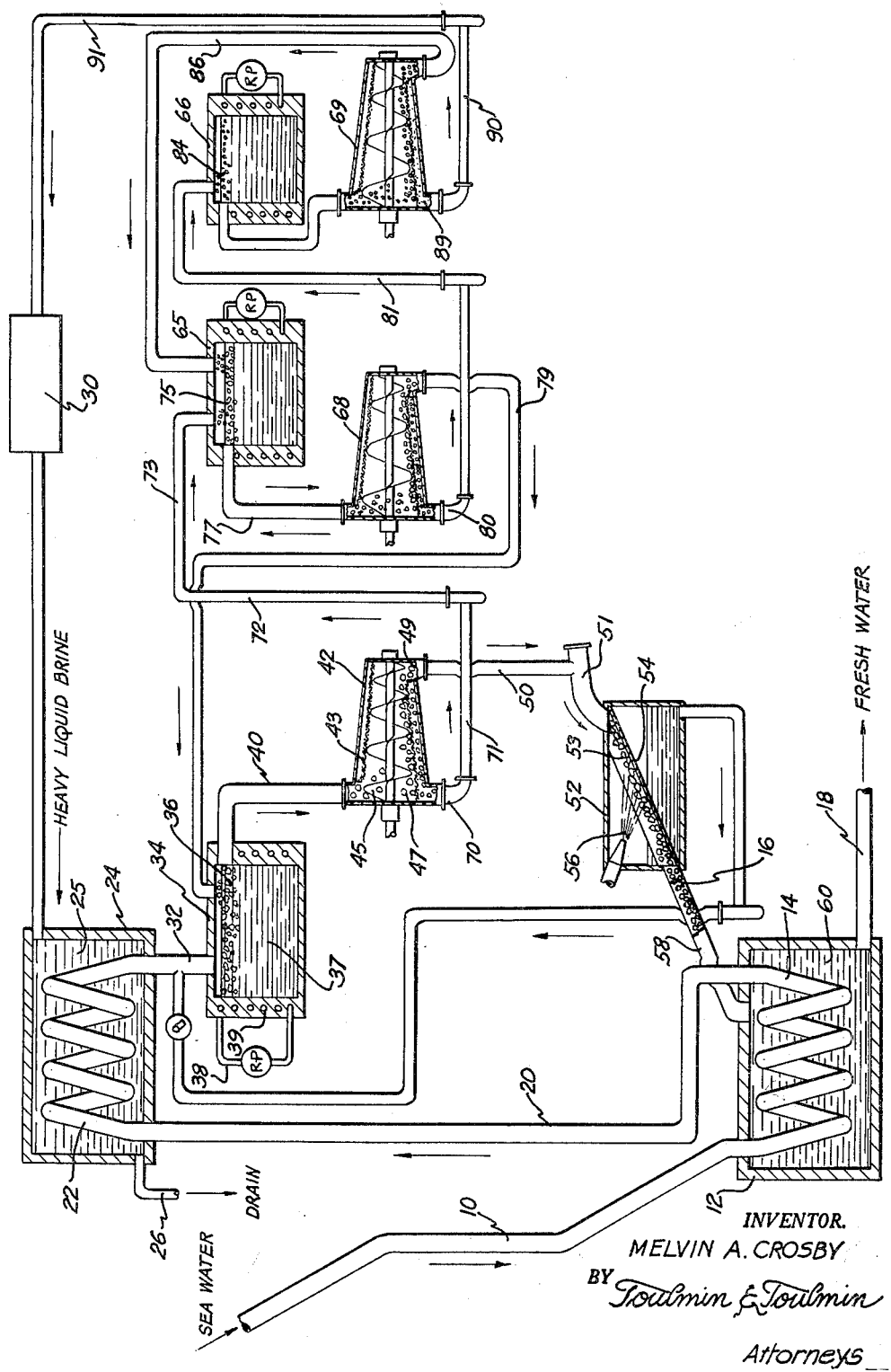

3,069,864
RECOVERY OF FRESH WATER FROM SEA WATER
Melvin A. Crosby, Dayton, Ohio, assignor to Commonwealth Engineering Company of Ohio, Dayton, Ohio
Filed Oct. 10, 1960, Ser. No. 61,624
4 Claims. (Cl. 62—58)

This invention relates to a method of converting saline waters to fresh water, or such as contain relatively small amounts of objectionable salts. The invention concerns more specifically an improved method for extracting fresh water from sea water by a controlled freezing treatment of the water.

While it has been proposed, heretofore, to recover fresh water from the sea by refrigeration of the sea water to form ice crystals and then melting the thus formed ice crystals to produce water, the process has been difficult to operate successfully because the ice crystals formed are very small and tend to occlude various amounts of the salt which it is desired to eliminate.

In accordance with my improved process, an economical freezing method is provided employing multiple stages and recycling steps whereby relatively large ice crystals are formed which are substantially free of entrapped salt solution, and which can be separated from the saline mother liquor and melted to recover water relatively free of salt and dissolved inorganic substances.

A preferred apparatus and method of practicing my invention is illustrated diagrammatically in the accompanying drawing.

Referring to the drawing in more detail, sea water is introduced through conduit 10 to a heat exchanger 12, conduit 10 communicating with a coil 14 as shown. This heat exchanger 12 makes use of the incoming sea water to melt ice crystals 16 delivered thereto from the refrigeration system and which when melted constitute the fresh water which may be drawn off through pipe 18.

Sea water flows from the heat exchanger coil 14 through pipe 20, as indicated by the arrows, to coil 22 arranged in a counterflow heat exchanger 24. The counterflowing solution in the exchanger consists of brine concentrate or mother saline liquor 25 which may be passed to a drawin or discharge conduit as at 26. The counterflowing heavy brine water cools the incoming sea water flowing through coils 22 before the same passes to the first freezing tank of the series.

Previously to entering the counterflow heat exchanger 24, the brine concentrate passes through a refrigerator unit 30 whereby the brine is cooled to a temperature on the order of 25° F. to lower the temperature of the sea water flowing through coil 22 approximately 27½° F. or to a temperature at which the sea water is chilled to its freezing point.

This chilled sea water flows from the counterflow heat exchanger 24 through conduit 32 to the initial freezing tank 34 where the temperature is maintained at about 26° F. or such as to cause ice crystals to form throughout the body of the solution and float to the surface, as illustrated at 36. The temperature of the freezing tank 34 is closely controlled whereby the temperature of about 26° F. is maintained to produce ice crystals of relatively large size and having an average size of 2 mm. in diameter. Refrigerant such as ammonia or butane is suitably circulated through the conduit 38 and coils 39 arranged about the tank 34.

Ice crystals 36, together with mother liquor or brackish brine water 37, are drawn from tank 34 through conduit 40 and passed to a centrifuge or screening device 42 which is equipped with an inclined screen 43, the mesh being of a size to permit the passage therethrough of ice crystals of a size of 1 mm. or less in diameter. A screw conveyor 45 is arranged to convey ice crystals retained on the screen, as indicated by the reference character 47, to the discharge outlet 49 and thence through conduits 50 and 51 to the rinsing tank 52, as shown by the arrows on the drawing.

Ice crystals 53 are discharged from conduit 51 onto a tray 54 which is inclined downward and arranged to pass the ice crystals, after being washed by a fresh water spray 56, into a discharge conduit or chute 58 emptying into the heat exchanger 12, the discharged ice crystals being melted to form fresh water as indicated at 60.

For recycling purposes, and to provide a continuous operating system additional refrigerating tanks may be employed, such as shown at 65 and 66, and which are operated in conjunction with centrifuges or screening devices 68 and 69 respectively, in the same manner as refrigerator tank 34 and centrifuge or screening device 42. Refrigerator tank 65 is connected to the centrifuge or screening device 42 through the discharge conduit 70, and communicating conduits 71, 72 and 73. The flow of the salt water that is being treated, and counterflow of ice crystals back to the refrigerator tank 34, is indicated by the arrows on the drawing.

Ice crystals formed in the refrigerator tank 65, as shown at 75, are drawn off to the centrifuge or screening device 68 through conduit 77, and large size ice crystals are returned through conduit 79 to the refrigerator tank 34. If desired, the large size ice crystals as produced in the refrigerator tanks may be transferred directly to the rinsing tank 52.

The smaller size ice crystals and slushy mass of mother brine that is discharged from centrifuge or screening device 68 is conducted through the conduit 80 and connecting pipe 81 to the refrigerator tank 66, as illustrated on the drawing. Ice crystals and water, as at 84 in refrigerator tank 66, are conducted to the centrifuge or screening device 69 and the large size ice crystals returned to tank 65 through conduit 86.

The smaller size ice crystals and mother brine from the centrifuge or screening device 69, as indicated at 89, are returned through conduits 90 and 91 to the refrigerator means 30 and thence to the counterflow exchanger 24.

The ice crystals are rinsed with pure water or water which has been recovered from the exchanger 12 and drawn off through conduit 18.

It is also possible as a modification that the amount of concentration of the sea water may be such that the salt will precipitate in some of the later freezing stages such as in tanks 65 and 66, which are refrigerated and can be removed either mechanically by utilizing settling chambers, not shown.

Further, if desired, centrifuges may be employed between the freezing stages to separate the ice from the liquid and employing various modifications thereof to separate the large and small size ice crystals. It will also be understood that suitable pumps will be used to convey the slushy mass of ice crystals and liquor through the system.

The salt water treating system of the above invention is calculated to have a heat economy relatively high because the incoming sea water is generally at a temperature of about 40–60° F., and due to the heat exchangers the discharged final fresh water and brine are generally at a temperature of about 32° F. This represents an extraction heat ratio of about 30° F. It is further calculated that approximately 8.2 watt hours of operation of the system of the invention will be required to produce a pound of fresh water, assuming about 50% efficiency is obtained. This would give approximately 16.44 watt hours per pound of water produced and which compares favorably with the expenditure of 20 watt hours per pound of water produced when employing a vapor compression distillation process.

While a specific embodiment of my invention has been disclosed and illustrated in the drawings, it will be understood that the system may be modified by those skilled in the art to accomplish the improved results of the invention without departing from the spirit and scope thereof, except as defined more particularly in the claims appended hereto.

What is claimed is:

1. A process for recovering fresh water from saline water comprising the steps of subjecting the saline water to a succession of partial freezing treatments in successive tanks, separating the larger ice crystals from the mother liquor immediately after leaving the first tank, washing said ice crystals and melting them for the production of fresh water, subsequently separating the larger ice crystals from the mother liquor after leaving each succeeding tank, and returning said subsequently separated ice crystals to a preceding tank.

2. The process of claim 1, wherein the wash liquid is delivered to one of the freezing tanks.

3. The process of claim 1, wherein the saline water is first passed through a heat exchanger in which the heat of the saline water is used for melting the ice crystals.

4. The process of claim 1, wherein the mother liquor from the last tank, after separation of the ice crystals therefrom, is passed through a preheater for absorbing heat from the saline water.

References Cited in the file of this patent

UNITED STATES PATENTS

| | | |
|---|---|---|
| 2,862,824 | Wenzelberger | Dec. 2, 1958 |
| 2,887,851 | Toulmin | May 26, 1959 |
| 2,896,419 | Thompson | July 28, 1959 |

FOREIGN PATENTS

| | | |
|---|---|---|
| 217,766 | Australia | Oct. 16, 1958 |